Figure 2:
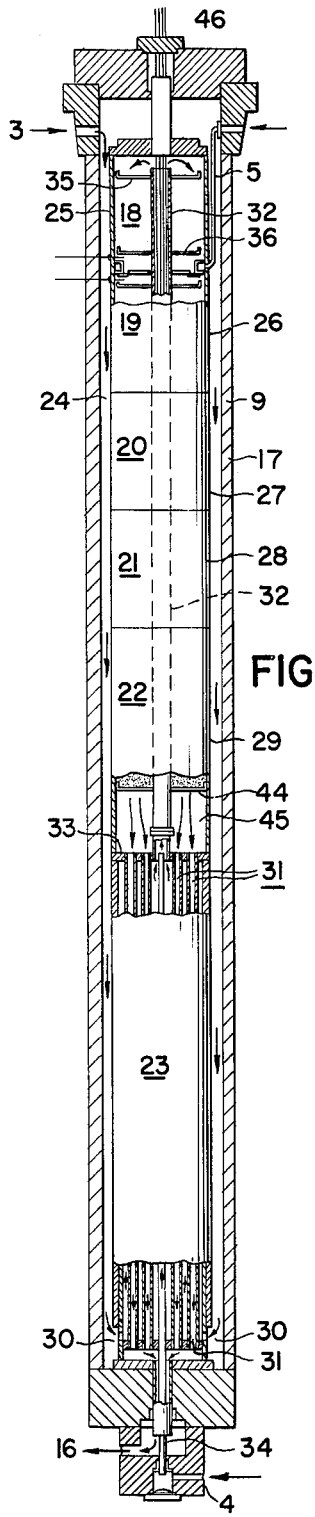

June 7, 1966    T. O. WENTWORTH    3,254,967
MULTIPLE BED CATALYST APPARATUS HAVING CLOSE TEMPERATURE CONTROL
Filed June 17, 1963    2 Sheets-Sheet 1

INVENTOR.
THEODORE O. WENTWORTH
BY Adams, Forward and McLean
ATTORNEY

June 7, 1966 T. O. WENTWORTH 3,254,967
MULTIPLE BED CATALYST APPARATUS HAVING CLOSE TEMPERATURE CONTROL
Filed June 17, 1963 2 Sheets-Sheet 2

INVENTOR.
THEODORE O. WENTWORTH
BY
ATTORNEY

United States Patent Office 3,254,967
Patented June 7, 1966

3,254,967
MULTIPLE BED CATALYST APPARATUS HAVING CLOSE TEMPERATURE CONTROL
Theodore O. Wentworth, Cincinnati, Ohio, assignor to Chemical Processes of Ohio Inc., Cincinnati, Ohio, a corporation of Ohio
Filed June 17, 1963, Ser. No. 288,226
3 Claims. (Cl. 23—288)

This invention relates to an apparatus which is particularly adapted to carrying out catalytic reactions which must be controlled accurately from the standpoint of reaction temperature. Among such reactions are the synthesis of methanol from hydrogen and carbon monoxide and the synthesis of ammonia from nitrogen and hydrogen.

The reaction of hydrogen and carbon monoxide in the presence of a catalyst to produce methanol is an operation which is widely practiced. The reaction temperature has a marked effect upon yield and by-product formation and must be strictly controlled. The reaction releases considerable heat, causing a rise in the reaction temperature as the reaction mixture passes through the catalyst mass. To reduce the temperature rise, a very large excess of hydrogen can be introduced into the reaction zone, but this means of reducing temperature rise suffers from the disadvantage that the excess hydrogen takes up reactor space which might otherwise be occupied by hydrogen and carbon monoxide reacting to form methanol.

It has heretofore been proposed (U.S. Patent No. 2,512,586 to Stengel) to produce methanol or ammonia in a vertically positioned reactor having in its upper part a number of catalyst beds through which the gases undergoing reaction pass downwardly in series and having in its lower part a heat exchanger wherein the effluent gases from the last catalyst bed heat fresh gases, thereby raising the temperature of those gases to reaction temperature before they pass through the first catalyst bed. A temperature rise takes place across each catalyst bed and therefore, after the gases undergoing reaction have passed through a given bed of catalyst, the temperature of the gases must be reduced before the gases enter the next bed of catalyst, if optimum reaction temperature conditions are to be maintained in the operation. This reduction in temperature is effected by the introduction of cold, fresh feed gases into the stream of gases undergoing reaction after they leave a given catalyst bed and before they enter the next bed. Similar principles apply in the case of endothermic reactions, with those reactions hot, fresh gases being introduced between the catalyst beds in order to raise the temperature of the combined stream of gases entering a given bed to the proper point for efficient operation.

In processes of the kind under discussion, wherein close temperature control is necessary, the temperature of the gases immediately prior to their entry into a given bed of catalyst should be uniform in the direction normal to the path of flow of the gases. This calls for very efficient and thorough mixing of the gases leaving a given bed and the fresh cold or hot gas, as the case may be, before the combined stream enters the next bed. The present invention provides apparatus which makes possible this very efficient and thorough mixing.

Figure 3:
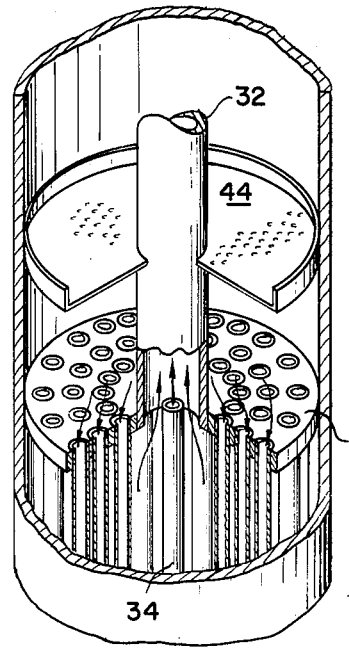
Figure 1:
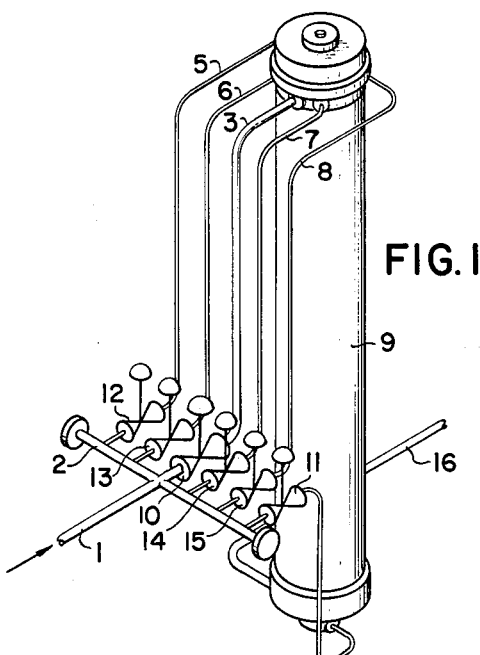
Figure 4:
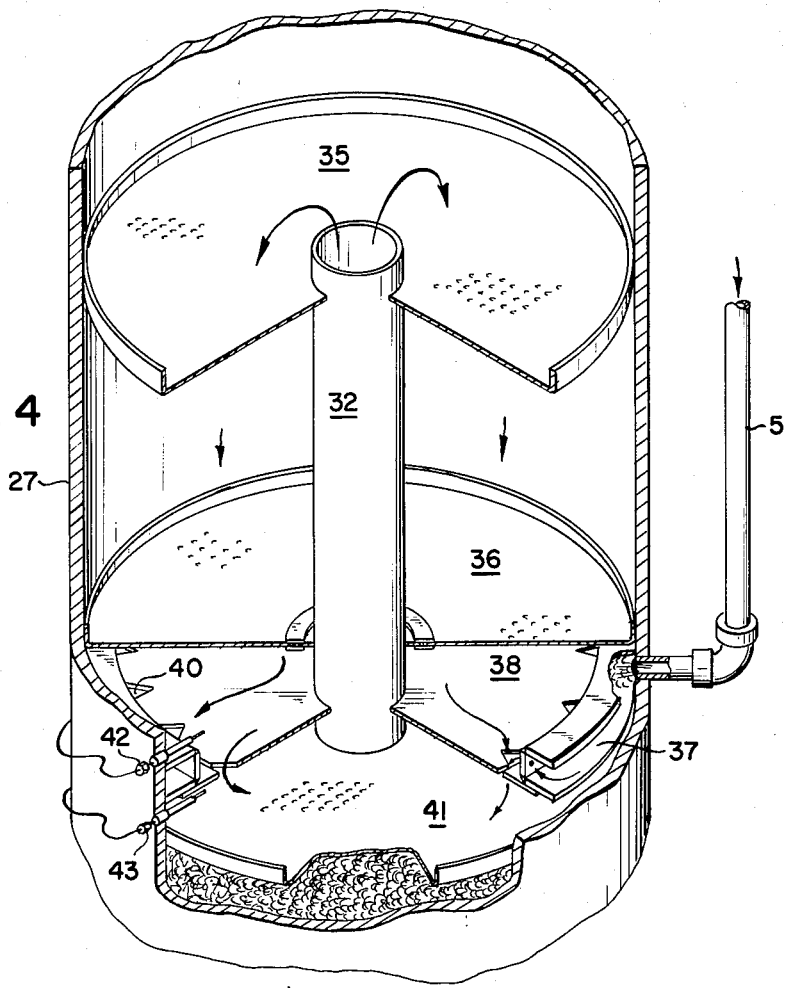
Figure 5:
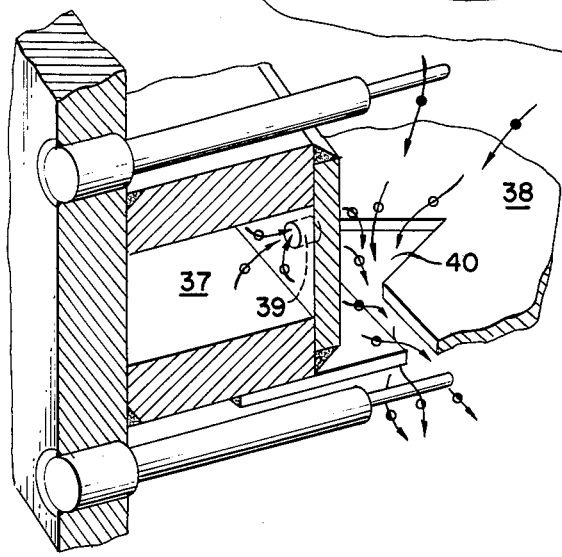

For a more complete understanding of the nature of the present invention, reference is made to the accompanying drawings which illustrate an embodiment falling within the scope of the invention, which is particularly adapted for producing methanol from hydrogen and carbon monoxide and in which:

FIG. 1 is an external view of a vertically positioned, cylindrical reaction vessel and its external piping and flow control valves;

FIG. 2 gives further details of the construction of the reaction vessel shown in FIG. 1, the vessel being provided in its upper part with five beds of catalyst arranged in series and in its lower part with a heat exchanger;

FIG. 3 gives details of the construction of the vessel in the region of the top of the heat exchanger;

FIG. 4 shows the construction of the vessel intermediate catalyst beds whereby efficient mixing of the gases leaving a bed and cold gas is obtained; and FIG. 5 illustrates in greater detail a portion of FIG. 4.

Referring particularly to FIG. 1, the numeral 1 represents a conduit or pipe connected to a source (not shown) of feed gases to be reacted, such gases being a suitable mixture containing hydrogen and carbon monoxide in the case where methanol is to be produced. Conduit 1 is connected to header 2, from which a main feed gas stream flows through line 3, a primary cold shot flows through line 4 and secondary cold shots flow through lines 5, 6, 7, and 8 into reaction vessel 9. Valves 10, 11, 12, 13, 14 and 15 are provided to control the rate of flow of feed gas through lines 3, 4, 5, 6, 7 and 8, respectively. The products of the reaction which occurs in reaction vessel 9 leave the reaction vessel through exit line 16.

Referring now to FIG. 2, reaction vessel 9 is constructed of a heavy outer shell 17 which contains in its upper portion five beds of catalyst which are generally designated by the numerals 18, 19, 20, 21 and 22, going from the top of the reaction vessel toward the bottom. Reaction vessel 9 also has single-pass tubular heat exchanger, generally indicated by the numeral 23, positioned in its bottom portion.

Still referring to FIG. 2, the general flow of the gases undergoing reaction therein is as follows: The main feed gas stream enters at 3 and flows downwardly through annular space 24 between the heavy outer shell 17 and catalyst receptacles 25, 26, 27, 28 and 29 and between shell 17 and heat exchanger 23. The main feed gas stream then passes through a plurality of holes 30 which are located in the bottom of heat exchanger 23 and upwardly through heat exchanger 23 on the outside of the tubes 31 that form a part thereof. After passing through heat exchanger 23 and being heated therein, the main feed gas stream enters the axially positioned conduit 32, which is connected to the uppermost header 33 of heat exchanger 23, as is shown more clearly in FIG. 3. Upon entering conduit 32, the main feed gas stream admixes with the primary cold shot stream which enters the reaction vessel through line 4 and passes upwardly through axially positioned conduit 34 located within tubular heater 23. By appropriate control of valves 10 and 11 it is possible to control the relative amounts of main feed gas and primary cold shot present in the mixture passing through conduit 32 and hence the temperature of that mixture. Conduit 34 is of sufficient length such that the primary cold shot passes directly through the heat exchanger before being admixed with the main feed gas stream.

FIG. 4 shows the construction of the reaction vessel at the uppermost bed of catalyst with the catalyst removed. The numeral 35 represents an upper perforated plate and the numeral 36 a lower perforated plate, the latter of which supports the uppermost bed of catalyst when the catalyst is in position.

Still referring to FIG. 4 and also now to FIG. 5, the combined stream of main feed gas and primary cold shot flows through conduit 32 and then down through plate 35 and the bed of catalyst supported on plate 36. In passing through the bed of catalyst, the temperature of the gas stream rises and the gas stream passes through plate 36. Positioned below plate 36 in the chamber defined by plates 36 and 41 are circular or circumferential manifold 37 and horizontal baffling plate 38. The manifold is connected to secondary cold shot line 5 and is provided with a plurality of holes 39 through which the secondary cold shot stream can flow into admixture with the stream of reactant gases which have passed through plate 36. Baffling plate 38 is located horizontally below the holes 39 and is provided with notches 40 through which the reactant gases flow, the reactant gases now containing also the secondary cold shot flowing through line 5. The reactant gases, after passing through notches 40, then flow across perforated plate 41 and into the next catalyst bed. The numerals 42 and 43 represent thermocouples which, respectively, measure the temperature of the gas stream before and after the introduction of the secondary cold shot. This procedure is repeated as the reactant gases pass down the reaction vessel through the various catalyst beds.

Referring now to FIG. 2, the numeral 44 represents a perforated plate which supports the bottommost bed of catalyst. The stream of gases being processed passes downwardly through plate 44, into channel 45, down through tubes 31 and out the reaction vessel by means of exit line 16.

The numeral 46 represents in diagrammatic form electrical connections to electric heaters which are conventionally used in the art for start-up purposes.

*Example*

As a specific illustration, a vessel such as that shown in the drawings is constructed having an overall length of about 48 feet and an outside diameter of about 6 feet. The vessel contains 5 beds of catalyst, the beds, going from the top to the bottom of the vessel, containing 2350, 2605, 2875, 3140 and 5210 pounds of catalyst, respectively. The catalyst is a conventional zinc oxide-chromium oxide methanol synthesis catalyst having a particle size of about 8 mm.

The feed gas introduced into the line 1 of the drawings is at a pressure of 5915 p.s.i.a., a temperature of 134° F. and contains the following gases in the following mole percentages: hydrogen, 58.55; carbon monoxide, 11.53; carbon dioxide, 3.21; methane, 17.57; ethane, 1.65; and nitrogen, 7.49.

About 7000 pound moles per hour of main feed gas stream is introduced through line 3. The amount of primary cold shot introduced through line 4 is so adjusted as to maintain the temperature of the mixture of main feed gas stream and primary cold shot entering the first bed of catalyst at about 630° F. In order to do this, 700–1400 pound moles per hour of primary cold shot is introduced into the reaction vessel through line 4. When operating in this manner, the temperature of the gases leaving the first bed of catalyst is about 670° F.

The amounts of secondary cold shots introduced after the first, second, third and fourth beds of catalyst is so adjusted as to maintain the temperature of the reactant mixture entering the second, third, fourth and fifth beds of catalyst, respectively, at 630° F. In order to accomplish this, about 600–800 pound moles per hour of secondary cold shot is introduced between the first and second beds, about 700–900 pound moles per hour of secondary cold shot is introduced between the second and third beds, about 800–1000 pound moles per hour of secondary cold shot is introduced between the third and fourth beds and about 900–1100 pound moles per hour of secondary cold shot is introduced between the fourth and fifth beds.

The product stream flowing through line 16 is at a pressure of about 5650 p.s.i.a., a temperature of about 320° F., and contains the following materials in the following mole percentages: hydrogen, 55.10; carbon monoxide, 8.72; carbon dioxide, 3.27; methane, 18.98; ethane, 1.77; nitrogen, 8.08; methanol, 3.68; dimethyl ether, 0.05; higher alcohols, 0.02; and water, 0.33.

What is claimed is:

1. In an apparatus for conducting a chemical reaction in the gaseous phase comprising a vertically positioned, cylindrical outer shell, a heat exchanger positioned in the bottom of the shell, a plurality of catalyst beds contained in superimposed catalyst receptacles positioned above said heat exchanger and spaced from the inner wall of said shell to provide an annular space therebetween which communicates with said heat exchanger, the upper and lower limits of each of said catalyst receptacles being defined by upper and lower perforated plates, and the catalyst receptacles being separated by chambers, means for introducing a first stream of gases to be reacted into said annular space between said catalyst receptacles and said shell, from thence upwardly through said heat exchanger, from thence to the uppermost of said catalyst beds, from thence downwardly through said catalyst beds, and from thence downwardly through said heat exchanger in indirect heat exchange relationship with the portion of said first stream of gases passing upwardly through said heat exchanger and out the said apparatus, means for introducing a second stream of gases to be reacted into said first stream of gases after said first stream of gases has passed through said heat exchanger and means for introducing a third stream of gases to be reacted into the gases leaving at least one of said catalyst beds other than the last, the improvement which comprises a circumferential manifold positioned in the one of said chambers immediately below said one of the catalyst beds, said means for introducing said third stream of gases to be reacted introducing the gases into said manifold, said manifold being provided with a plurality of holes serving as conduits through which said third stream of gases can flow into admixture with the gases leaving said one of the catalyst beds positioned immediately above said manifold and a baffling plate positioned horizontally below the holes in said manifold, said plate being provided at its periphery with notches which are located opposite said holes and which serve as conduit means whereby gases leaving the catalyst bed positioned immediately above said manifold can flow to the catalyst bed positioned immediately below said manifold, said holes discharging said third stream of gases directly into the gases flowing through said notches whereby increased mixing of the gases leaving said one catalyst bed and said third stream of gases is accomplished.

2. An apparatus according to claim 1 provided with a first axially positioned conduit passing through the entire length of said heat exchanger serving as part of said means for introducing said second stream of gases and a second axially positioned conduit positioned above said first axially positioned conduit, said second axially positioned conduit being of larger cross-sectional area than said first axially positioned conduit, said second axially positioned conduit serving as means for the passage of said first stream of gases to be reacted from said heat exchanger to the uppermost of said catalyst beds and as part of the means for introducing said second stream of gases to the uppermost of said catalyst beds.

3. An apparatus according to claim 2 wherein said heat exchanger is a single-pass tubular heater provided with a shell, a plurality of tubes through which the gases flow after leaving the lowermost bed of catalyst, an upper tube sheet and a lower tube sheet, the perforated plate supporting the lowermost bed of catalyst and the upper tube sheet defining, respectively, the top and bottom of a channel for the gases entering said tubes, and the free space of said heat exchanger external to said tubes being in communication with said second axially positioned conduit and serving as the means for the passage of said first stream of gases to be reacted from said annular space between said catalyst receptacles and said shell to said second axially positioned conduit.

References Cited by the Examiner

UNITED STATES PATENTS

| | | | |
|---|---|---|---|
| 1,910,365 | 5/1933 | Richardson | 23—289 |
| 1,949,122 | 2/1934 | Jeffcott | 23—288.4 |
| 1,959,898 | 5/1934 | Brode et al. | 23—288.4 |
| 2,046,816 | 7/1936 | Fowler et al. | 23—288.4 |
| 2,512,586 | 6/1950 | Stengel | 23—288.9 |
| 2,632,692 | 3/1953 | Korin et al. | 23—288 |
| 3,002,816 | 10/1961 | Friend et al. | 23—199 |
| 3,164,446 | 1/1965 | Drechsel et al. | 23—288 |

FOREIGN PATENTS 892,743   10/1953   Germany.

MORRIS O. WOLK, *Primary Examiner.*

J. SCOVRONEK, *Assistant Examiner.*